Jan. 5, 1937.  W. B. OSBORNE  2,066,482
TRANSMISSION
Filed Nov. 19, 1934
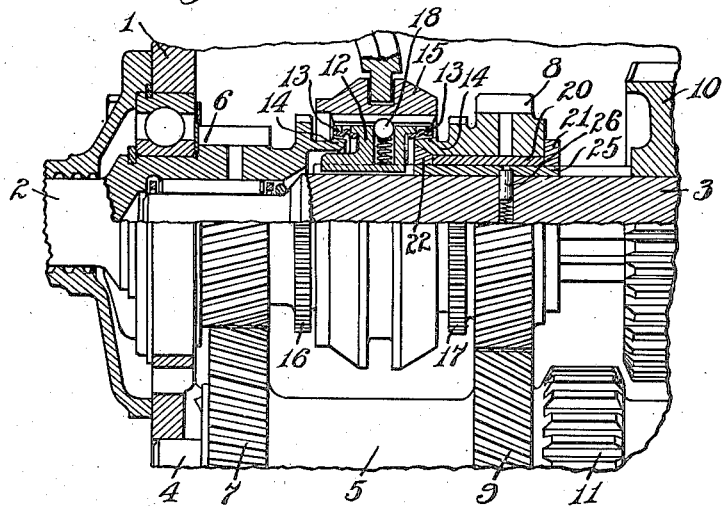
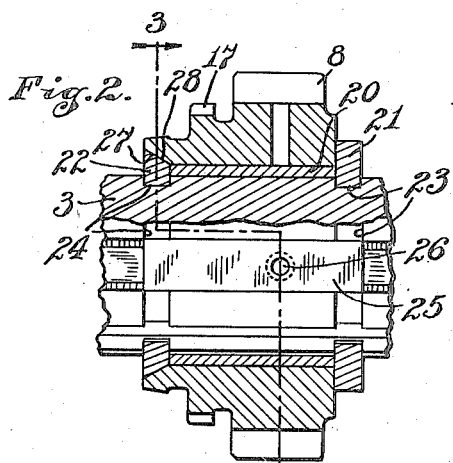
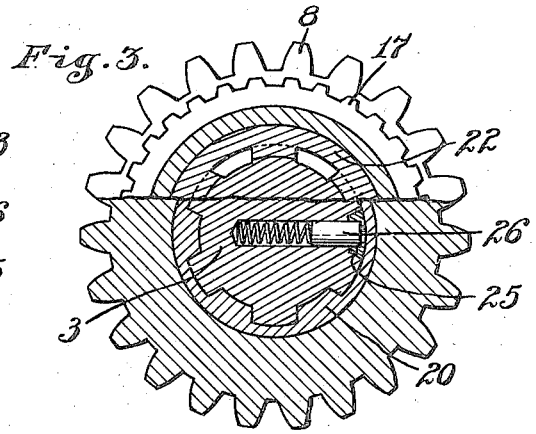
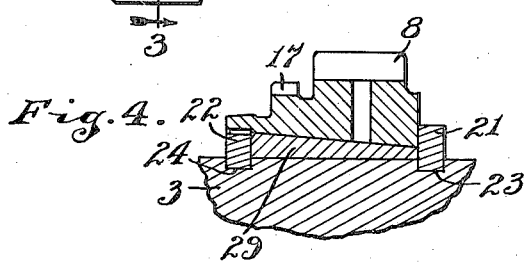
INVENTOR
William B. Osborne,
BY
Hood + Hahn
ATTORNEYS Patented Jan. 5, 1937

2,066,482

UNITED STATES PATENT OFFICE 2,066,482

TRANSMISSION

William B. Osborne, Muncie, Ind., assignor, by mesne assignments, to Borg-Warner Corporation, Chicago, Ill., a corporation of Illinois Application November 19, 1934, Serial No. 753,563

1 Claim. (Cl. 308—161)

My invention relates to improvements in automobile transmissions and particularly to the type of transmissions wherein certain of the gears, at least, are adapted to be operated in constant mesh, clutch means being provided for connecting the gears to the shafts.

My invention is particularly applicable to the above type of transmission wherein the gears are of the helical type.

In the above type of transmission, wherein the second speed gear especially, is freely rotatable on the shaft and is adapted to be connected thereto by means of a suitable clutch mechanism, it has been found that unless the gear is fitted with extreme accuracy to the shaft or where the gear has become somewhat worn in its hub so that it does not fit with extreme accuracy on the shaft there is a tendency, especially when the gear is in mesh and the car is coasting down hill and is being held by the engine compression, for the gear to wobble a bit on its shaft and "walk" the clutch out of engagement.

My present invention is designed primarily for the prevention of the above in a cheap and efficient manner.

For the purpose of disclosing my invention, I have illustrated certain embodiments thereof in the accompanying drawing, in which Fig. 1 is a longitudinal partial section of a transmission embodying my invention;

Fig. 2 is a longitudinal sectional view of the second speed gear mounting somewhat enlarged;

Fig. 3 is a transverse sectional view on the line 3—3 of Fig. 2; and

Fig. 4 is a detail of a modified form of mounting for the gear.

In the embodiment of the invention illustrated, the transmission is mounted in the usual housing 1 and includes a driving shaft 2, and a driven shaft 3 as well as a counter shaft 4 having the counter shaft gear spindle 5 thereon. The driving shaft 2 is provided with a gear 6 constantly meshing with the gear 7 on the counter shaft 5. The driven shaft 3 is provided with a second speed gear 8 in constant mesh with a gear 9 on the counter shaft. This set of gears is of the helical tooth type for greater quietness and ease of operation. In addition to the above gears I also provide a low and reverse gear 10, adapted to mesh for low speed with a gear 11 on the spindle 5. This gear is of the axially shiftable type, being splined on the shaft 3.

The type of clutch for connecting the gear 8 to the shaft 3, or for connecting the two shafts together for direct drive, is of the synchronizing type and consists of a hub 12 having suitable cone clutches 13, 13 adapted for cooperation with cone clutches 14, 14 on both the shaft 2 and the gear 8. A sliding collar or sleeve 15 has a toothed engagement with the hub and the teeth of this collar are adapted to mesh with teeth 16 or 17 respectively on the shaft 2 or the gear 3 for either direct drive or connecting the gear 8 to the shaft 3. The collar and hub are resiliently connected, so that they will move together for a portion of their axial movement, by spring pressed poppets 18.

When it is desired to establish direct drive it is merely necessary to move the collar 15 to the left, looking at Fig. 1, to engage the teeth thereof with the teeth 16. Likewise when it is desired to establish second speed drive it is merely necessary to remove the collar 15 to the right to engage the teeth thereof with the teeth 17. This of course connects the gear 8 with the shaft 3.

The shaft 3 is preferably splined throughout its length and the gear 8 is mounted to rotate on a preferably bronze collar 20 mounted on the shaft and having internal splines fitting the splines of the shaft at this point. This collar as well as the gear is held against longitudinal movement on the shaft by suitable locking rings or abutment rings 21 and 22. To accommodate these rings the shaft is provided with spaced apart annular grooves 23 and 24 and the rings have suitable recesses in their inner periphery to accommodate the splines of the shaft whereby the rings may be slipped into position on the shaft and thereby giving the rings a slight turn to bring the splines thereof opposite the splines of the shaft. The rings are thus held against longitudinal movement. In order that the rings may be held also against rotative movement after their position has been established I provide a locking key 25 which passes through a space between the splines on the shaft and into notches on the rings. This key is held against longitudinal displacement by a spring pressed plunger 26.

Due to the fact that the gear 8 may not fit as snugly on its bushing 20 as it should or due to the fact that after considerable wear the fit of the gear on its bushing becomes somewhat loose, there is a tendency on the part of the gear to slightly wobble on its shaft. This misalignment and wobbling rotation tends to walk the clutch ring 15 out of engagement with the teeth 17 of the gear. It has been found, in actual practice, that this disengaging movement is more apt to occur when the car is placed in second gear drive and coasts down hill relying on the compression of the engine for the braking force. For some reason when the second speed drive is forward and the tendency of the spiral gears is such as to move the gear back against the abutment ring 21 this walking out of the clutch is not as noticeable.

In order to cure this defect, I have provided the abutment ring 22 with a bevel top surface 27 and have correspondingly beveled the internal surface 28 of the end of the hub of the gear 8. As a result of this arrangement, even though the gear 8 runs slightly out of alignment when rotating on its bushing, when the car is in second gear and the shaft 3 becomes the driving shaft, there is a tendency for the helical or spiral teeth of the meshed gears to move the second speed gear forward forcing the two bevel surfaces together and thus true the gear on its shaft. As a result misalignment of the gear is corrected and there is no tendency to walk out the clutch.

In Fig. 4 I have illustrated a modified form of my structure wherein I have provided a tapered bushing 29 for the gear, which extends throughout the length of the hub thereof and have correspondingly tapered the opening in the gear. In this construction care must be taken that the taper should not be too small as otherwise there would be a tendency on the part of the gear to wedge on the shaft or stick.

I claim as my invention:

In a transmission, a shaft, a gear rotatably mounted on said shaft and having a tapered bearing surface, an abutment ring axially fixed on said shaft to prevent said gear from moving in one direction, said ring having a tapered bearing surface for cooperating with the tapered bearing surface of said gear.

WILLIAM B. OSBORNE.